UNITED STATES PATENT OFFICE.

MAURICE P. MUNDER, OF BALTIMORE, MARYLAND.

IMPROVEMENT IN MEDICAL COMPOUNDS OR LINIMENTS.

Specification forming part of Letters Patent No. 142,499, dated September 2, 1873; application filed August 8, 1873.

*To all whom it may concern:*

Be it known that I, MAURICE P. MUNDER, of Baltimore, in the county of Baltimore and State of Maryland, have invented a certain Medical Compound for the Cure of Rheumatism, Sprains, &c., of which the following is a specification:

The remedy is prepared by mixing, in equal parts, by weight, the following ingredients, viz: Laudanum, saltpeter, spirits of ammonia, crude petroleum, turpentine, spirits of camphor, oil of sassafras.

These ingredients are well mixed, and the mixture put up in suitable bottles. It is applied outwardly to the parts affected, either by rubbing in or bandaging, or both.

The proportions above stated may be somewhat varied without changing the essential properties of the compound.

What I claim as my invention, and desire to secure by Letters Patent, is—

A compound consisting of laudanum, saltpeter, spirits of ammonia, crude petroleum, turpentine, spirits of camphor, and oil of sassafras mixed in substantially the proportions specified.

In testimony that I claim the foregoing I have hereunto set my hand this 8th day of August, 1873.

MAURICE P. MUNDER.

Witnesses:
B. EDW. J. EILS,
H. E. QUINN.